United States Patent
Kiuchi et al.

(10) Patent No.: US 6,959,277 B2
(45) Date of Patent: Oct. 25, 2005

(54) VOICE FEATURE EXTRACTION DEVICE

(75) Inventors: Shingo Kiuchi, Iwaki (JP); Toshiaki Asano, Iwaki (JP); Nozomu Saito, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 403 days.

(21) Appl. No.: 09/891,876

(22) Filed: Jun. 26, 2001

(65) Prior Publication Data

US 2002/0022957 A1 Feb. 21, 2002

(30) Foreign Application Priority Data

Jul. 12, 2000 (JP) ............................. 2000-212067

(51) Int. Cl.$^7$ ............................................. G10L 15/20
(52) U.S. Cl. ................... 704/233; 704/266; 704/203; 379/406.1
(58) Field of Search ............................. 704/226, 203, 704/204, 266, 201; 379/406.1; 342/188; 701/202; 329/406.1

(56) References Cited

U.S. PATENT DOCUMENTS

| | | | |
|---|---|---|---|
| 5,027,123 A * | 6/1991 | Haykin et al. | ............... 342/188 |
| 5,274,560 A * | 12/1993 | LaRue | .................... 701/202 |
| 5,712,956 A | 1/1998 | Yamada et al. | |
| 5,805,696 A * | 9/1998 | Im et al. | ................. 379/406.1 |
| 5,905,969 A * | 5/1999 | Mokbel et al. | ............. 704/203 |
| 6,182,036 B1 | 1/2001 | Poppert | |
| 6,263,307 B1 * | 7/2001 | Arslan et al. | ............... 704/226 |

* cited by examiner

Primary Examiner—Susan McFadden
Assistant Examiner—Huyen X. Vo
(74) Attorney, Agent, or Firm—Brinks Hofer Gilson & Lione

(57) ABSTRACT

In a conventional device for extracting voice features accurately without being influenced by noises, such as a voice recognition device, usually an input voice signal is processed first by a noise reduction system having the tap length N, and the result is FFT-processed by L-points, and then the power spectrum vector is calculated; accordingly, a one time operation requires N multiplications and (N−1) summations. The voice feature extraction device according to the invention receives a voice signal including noises from a microphone, which is processed by a window function operation unit, and thereafter FFT-processed by an FFT operation unit by L-points. A power calculation unit calculates a power spectrum vector of the input voice signal. However, a noise reduction system determines in advance a filter coefficient of this system and processes the coefficient to calculate a noise reduction coefficient, and the power spectrum vector is processed by this noise reduction system. Thereby, the voice feature extraction device of the invention reduces the processing volume to 1/(4N−2) in comparison to the conventional device, lightens the processing load of the processing unit, and increases the processing speed.

18 Claims, 3 Drawing Sheets

VOICE FEATURE EXTRACTION DEVICE

BRIEF SUMMARY OF THE INVENTION

1. Field of the Invention

The present invention relates to a voice feature extraction device that, while reducing surrounding noises, extracts voice features in a voice recognition system, speaker recognition system, loudness compensation system or the like, by way of the power spectrum.

2. Related Art

A voice recognition system that recognizes a voice from a user, a speaker recognition system that identifies the voice of a specific person among the voices of plural speakers, a loudness compensation system that removes the surrounding noises or the like carries out extraction of a specific voice by way of the power spectrum of the voice received by a microphone.

When such a voice recognition system is used to receive a voice signal, for example, in setting a destination in a vehicle navigation system, there are various kinds of noises in the passenger compartment of a car, such as engine noise, frictional noise of the tires, whistling sounds of the wind, audio sounds and the like. A user's voice received by the microphone in such an environment is accompanied by those surrounding noises, so that the SN ratio decreases and the voice becomes unclear. In such a state, it becomes impossible to discriminate the voice features with precision and accomplish correct voice recognition. Therefore, when the voice recognition system is used in an environment with high surrounding noises, to separate the user's voice from the surrounding noises is an important requirement in order to enhance the success rate of voice recognition. Such circumstances provide problems not only to a voice recognition device in a vehicle navigation system, but also to voice recognition systems used in various other fields; and also to the above various acoustic fields.

In a conventional system as illustrated in the block diagram of FIG. 3, for example, the voice signal X(n) from a microphone 30 that includes the surrounding noises is provided to a noise reduction system (NR system) 31 containing a FIR filter having a tap length N. This noise reduction system operates every 1/fs (second), in which fs denotes the sampling frequency (Hz).

The NR system 31 produces a signal X(n)*W(n), which is provided to a window function operation unit 32 such as the Hanning window or the Humming window. The window function operation unit 32 prevents the generation of high-frequency components caused by a data jump at intervals of each frame sampled, and supplies the result to an FFT operation unit 33 that processes by L-points. The FFT operation unit 33 executes the fast Fourier transform at intervals of each frame to convert the time base signal into frequency components. The FFT operation unit 33 produces a spectrum signal X(w)·W(w), which is supplied to a power calculation unit 34. The power calculation unit 34 calculates the power spectrum, and attains a signal $[X(n)]^2 \cdot [W(n)]^2$.

However, in the above conventional voice feature extraction device, provided that the sampling frequency of the noise reduction system 31 is given by fs (Hz), and the tap length of the FIR filter is given by N, one time operation requires N multiplications and (N−1) summations. Thereafter, these calculation results are supplied to the FFT operation unit 33, and provided that the number of the points where the FFT operation unit 33 executes the operation is given by L, to output an L/2-degree feature vector requires the outputs of the noise reduction by L points. Therefore, this noise reduction system needs to execute N·L multiplications and (N−1)·L summations.

In order to extract still more accurate voice features by this type of processing system, if the value of N and the value of L are set larger, it will inevitably involve huge operation throughputs, and it will give a significant load to the processor in this system. Accordingly, the processing speed decreases, which sometimes adversely affects other processing, and makes it difficult to smoothly carry out the system processing. If the value of N and the value of L are set smaller, however, a correct extraction of the voice features will not be accomplished.

It is therefore an object of the invention to provide a voice feature extraction device that allows, while maintaining the same accuracy in the extraction of the voice features as in the conventional system, reducing the operation throughputs, decreasing the load on the processor, and increasing the processing speed.

SUMMARY OF THE INVENTION

In order to accomplish the foregoing object, the voice feature extraction device according to one aspect of the invention includes a noise reduction system coefficient calculation unit that calculates beforehand a noise reduction system coefficient of a noise reduction system to be used, and an input voice power spectrum calculation unit that calculates a power spectrum vector of a processed input voice. In this configuration, the noise reduction system that is set to the coefficient calculated by the noise reduction system coefficient calculation unit carries out an operation processing to the power spectrum vector calculated by the input voice power spectrum calculation unit.

According to another aspect of the invention, in the voice feature extraction device, the noise reduction system coefficient calculation unit includes a filter coefficient calculation unit that determines a filter coefficient of the noise reduction system to be used, and a power calculation unit that converts the filter coefficient determined by the filter coefficient calculation unit into the power spectrum vector.

According to another aspect of the invention, in the voice feature extraction device, the filter coefficient calculation unit executes an adaptive control to a signal having an input voice signal and a simulated voice signal added, and determines a tap coefficient to thereby calculate the filter coefficient.

According to another aspect of the invention, in the voice feature extraction device, a specific gain adjustment is executed to the simulated voice signal.

According to another aspect of the invention, the voice feature extraction device is applied to a voice recognition device of a vehicle navigation system.

DESCRIPTION OF A PREFERRED EMBODIMENT

Figure 1:
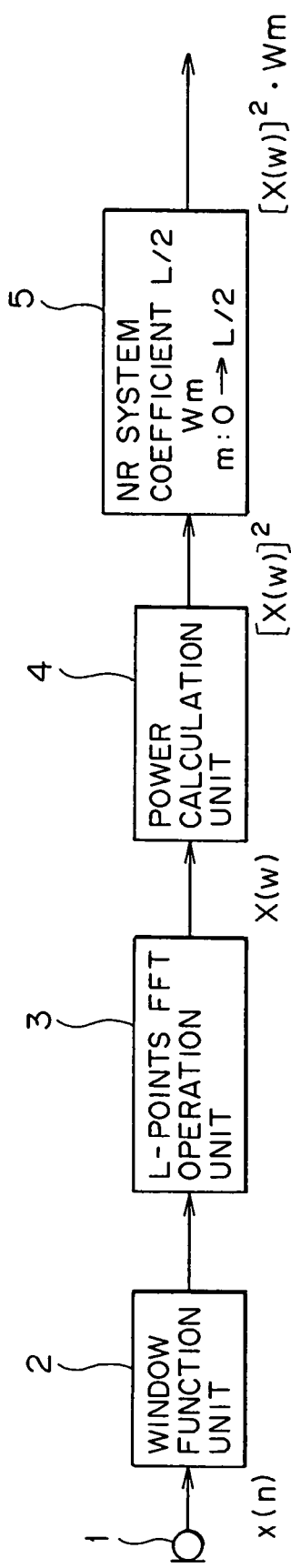
FIG. 1 is a circuit block diagram illustrating major components of a voice feature extraction device according to the present invention.

A preferred embodiment will be described with reference to the accompanying drawings. FIG. 1 is a block diagram illustrating the basic function of a voice feature extraction device according to the invention. The same functional blocks as in the conventional device are illustrated in the same manner. In the drawing, when the voice feature extraction device according to the invention is applied to a vehicle navigation system, for example, the device receives surrounding noises such as voice inputs for various operations and instructions to set destinations, etc., surrounding engine noise, frictional noise of tires, whistling noise of the wind and so forth through a microphone 1 to a window function operation unit 2 as a signal X(n).

Therefore, the "processed input voice" in this invention is the signal X(n) that includes the user's voice and the surrounding noises. The window function operation unit 2 passes this processed input voice through the window function such as the Hanning window or the Humming window in the same manner as in the conventional system, and thereby prevents generation of high-frequency components caused by a data jump at intervals of each frame sampled, and so forth.

The window function operation unit 2 supplies the result to an FFT operation unit 3 that processes by L-points. The FFT operation unit 3 executes the fast Fourier transform at intervals of each frame to convert the time base signal into frequency components. The FFT operation unit 3 produces a spectrum signal X(w), which is supplied to a power calculation unit 4. The power calculation unit 4 calculates an L/2-degree power spectrum to generate an output signal $[X(w)]^2$. In this invention, a noise reduction system 5 executes the same noise reduction processing as in the conventional system to the L/2-degree power spectrum vector being the input voice feature thus obtained.

In this noise reduction system 5, the power spectrum signal thus processed and input thereto has L/2-degree, and the coefficient value used in this system becomes L/2, and therefore, Wm herein is needed to be calculated from 0 through L/2 in regard to the value of m.

When this noise reduction system outputs the L/2-degree feature vector, provided that the input voice power spectrum is expressed by the following:

$$\vec{P} = (P_0 P_1 \ldots P_{L/2})^T \quad (1)$$

and the coefficient of the noise reduction system calculated in advance, which will be described later, is expressed by the following:

$$\vec{W} = (W_0 W_1 \ldots W_{L/2})^T \quad (2)$$

the output feature vector becomes:

$$\vec{Y} = (Y_0 Y_1 \ldots Y_{L/2})^T \quad (3)$$

$$\vec{Y} = (\vec{P})^T \times \vec{W} \quad (4)$$

Figure 3:
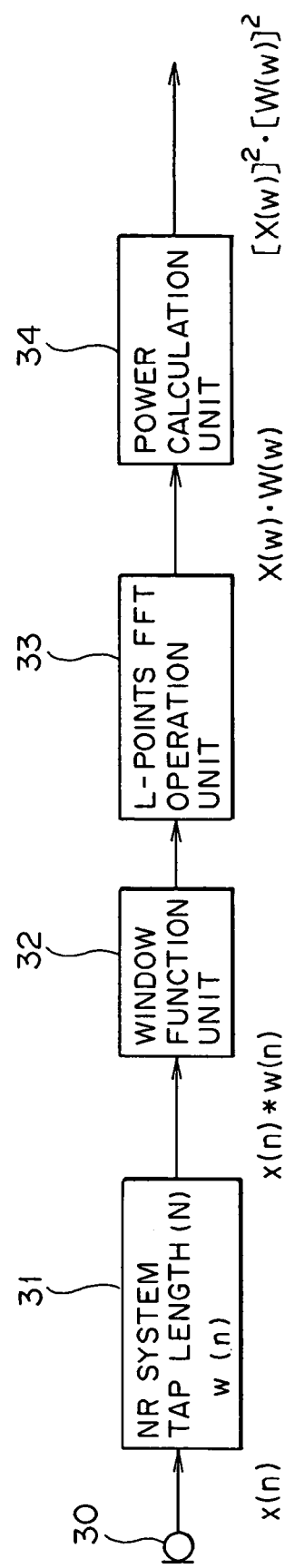
FIG. 3 is a circuit block diagram illustrating major components of a conventional voice feature extraction device.

The volume of calculations in this noise reduction system amounts to L/2 multiplications. Therefore, in comparison to the noise reduction processing on the time domain by the N-tap FIR filter in the conventional voice feature extraction device as shown in FIG. 3, the volume of calculations in this embodiment only needs 1/(4N−2) of the above conventional example.

Figure 2:
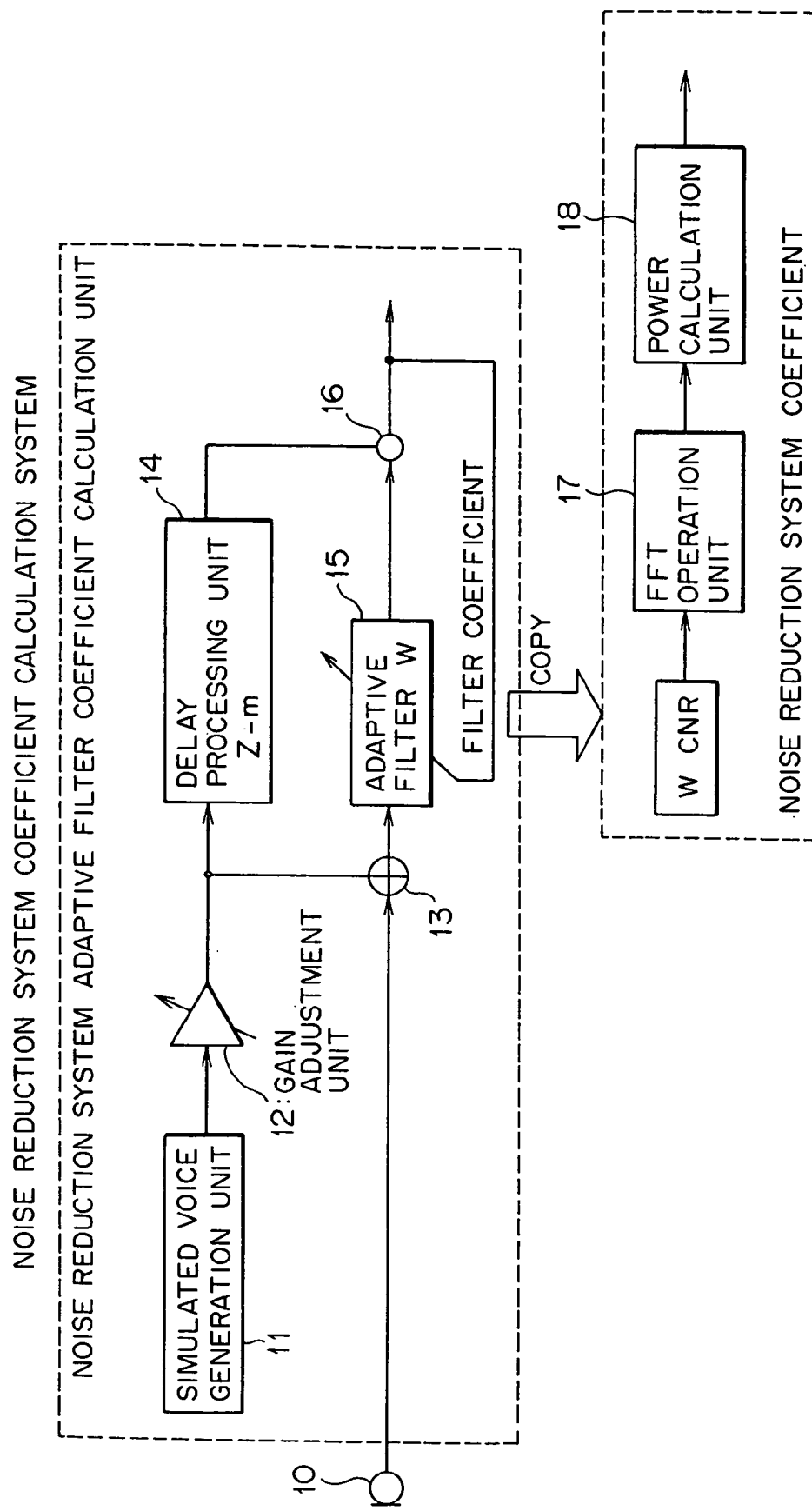
FIG. 2 is a circuit block diagram illustrating one example for calculating in advance a noise reduction system coefficient of a noise reduction system applied to the present invention.

With regard to the coefficient that determines the characteristics of the noise reduction system, for example, the noise reduction coefficient calculation system as illustrated in FIG. 2 allows a preliminary acquisition of the coefficient. The block diagram of the system that calculates the CNR coefficient used here illustrates an example adapting the voice emphasis system for 1 ch that is conventionally used, whereby the coefficient can be calculated by a comparably simple system.

While receiving an input of surrounding sounds through a microphone 10, this system also inputs a signal from a simulated voice generation unit 11 that generates a specified simulated voice signal, a gain adjustment unit 12 executes a gain adjustment to the signal, and an adder 13 adds the adjusted signal to the signal from the microphone 10. On the other hand, a delay processing unit 14 applies a delay processing of m-stage (L/2 stage) to the signal having the gain adjusted to produce a signal d(n). An adaptive filter 15 having the tap coefficient W processes the signal added by the adder 13 to produce a signal y(n). This signal y(n) and the signal d(n) from the delay processing unit 14 are supplied to a subtracter 16 to produce an error signal e(n) to thereby adjust the tap coefficient W. The value of the tap coefficient obtained by this control is determined as a coefficient of this adaptive filter, namely, a filter coefficient $W_{CNR}$ of this noise reduction system. The above processing corresponds to the filter coefficient calculation unit in this invention.

This system sets the tap length of the adaptive filter obtained here to the same as the number of the processing points of the FFT for calculating the voice feature vector. An FFT operation unit 17 executes an FFT operation processing to the adaptive filter coefficient $W_{CNR}$ that represents the characteristics of this noise reduction system thus attained. The result is supplied to a power calculation unit 18 to calculate a coefficient of the noise reduction system. The above processing corresponds to the power calculation unit in this invention that converts the filter coefficient into the power spectrum vector, and the filter coefficient calculation unit and the power calculation unit constitute the noise reduction system coefficient calculation unit in this invention.

In the system illustrated in FIG. 2, the gain of the gain adjustment unit 12 is to be determined by the trade-off of the distortion against the SN ratio improvement rate in the output y(n) of the adaptive filter. That is, to set the gain lower will make the distortion lower, however the improvement rate of the SN ratio decreases. On the other hand, to set the gain higher will make the distortion higher, however the improvement rate of the SN ratio increases. Accordingly, the gain of the gain adjustment unit 12 is adjusted to match with the characteristics of the system being used.

Thus, the system determines the characteristics of the noise reduction system in the time domain in advance, executes the FFT operation with the previously determined filter coefficient $W_{CNR}$ to calculate the power, calculates the noise reduction coefficient vector in the power domain, and calculates the L/2-degree coefficient of the noise reduction system, as shown by the expression (2).

In the noise reduction system 5 as shown in FIG. 1, with the voice power spectrum vector that the power calculation unit 4 calculates, as expressed by the expression (1), the noise reduction system 5 using the noise reduction system coefficient given by the expression (2) carries out the operation processing according to the expression (4) to thereby obtain the voice feature vector.

As mentioned above, the voice feature extraction device according to the invention acquires in advance the noise reduction coefficient that represents the characteristics of the noise reduction system, executes the FFT operation at the beginning of voice processing to obtain the power spectrum, and calculates the power spectrum vector by means of the noise reduction system. In contrast to this, the conventional device processes the input voice signal by means of the noise reduction system first, and then executes the FFT operation processing, which inevitably requires the processing of the phase part during the input voice processing. The voice feature extraction device of the invention saves the processing of the phase part during the input voice processing, and thereby the processing load becomes $1/(4N-2)$ of the processing volume of the conventional device; and yet, it achieves the voice feature extraction with a high accuracy that is by no means inferior to the conventional approach.

This type of voice feature extraction device can be applied widely not only to the voice recognition device of the vehicle navigation system, but also to various other of voice recognition devices, speaker recognition devices, loudness compensations, system and so forth.

The voice feature extraction device of the invention being thus configured, while maintaining the same accuracy in the extraction of the voice features as in the conventional system, it is able to reduce the operation throughputs, to lighten the load to the processor, and to increase the processing speed.

Further, in the noise reduction system coefficient operation unit including the filter coefficient calculation unit that determines the filter coefficient of the noise reduction system to be used, and the power calculation unit that converts the filter coefficient determined by the filter coefficient calculation unit into the power spectrum vector, the noise reduction coefficient of the noise reduction system to be used can be determined in advance easily and accurately with a simple technique.

Further, in the filter coefficient calculation unit that executes the adaptive control to a signal having the input voice signal and the simulated voice signal added, and acquires the tap coefficient to thereby calculate the filter coefficient, the noise reduction system coefficient of the noise reduction system to be used can be calculated in advance easily and accurately by means of the system that is conventionally used in the voice emphasis system for 1 ch, and so forth.

In a system that executes a specific gain adjustment to the simulated voice signal, to set the gain lower will make the distortion lower, however the improvement rate of the SN ratio decreases; and on the other hand, to set the gain higher will make the distortion higher, however the improvement rate of the SN ratio increases, which implements the voice feature extraction device having a desired characteristics by adjusting the gain to match with the characteristics of the system to be used.

Further, the invention can be applied effectively to a system that applies the voice feature extraction device to the voice recognition device of a vehicle navigation system, in an acoustically unfavorable environment having extremely high noises such as engine noise, frictional noise of tires, whistling sounds of the wind and so forth, and also in a situation in which a large-sized costly processor is difficult to introduce, and yet the navigation system requires a processor for the route guidance processing.

What is claimed is:

1. A voice feature extraction device comprising:
   a noise reduction system coefficient calculation unit that adds a gain-adjusted simulated voice signal to a surrounding signal, and calculates a noise reduction system coefficient of a noise reduction system based on the added signal and the gain-adjusted simulated voice signal delayed by a delay processing unit, and
   an input voice power spectrum calculation unit that calculates a power spectrum vector of a power spectrum signal produced from an input voice signal,
   wherein the noise reduction system that is set to the coefficient calculated by the noise reduction system coefficient calculation unit executes a noise reduction processing on the power spectrum vector.

2. A voice feature extraction device as claimed in claim 1, wherein the noise reduction system coefficient calculation unit includes a filter coefficient calculation unit that determines a filter coefficient of the noise reduction system to be used, and a power calculation unit that converts the filter coefficient acquired by the filter coefficient calculation unit into the power spectrum vector.

3. A voice feature extraction device as claimed in claim 2, wherein the filter coefficient calculation unit executes an adaptive control to a signal having the surrounding signal and the simulated voice signal added, and acquires a tap coefficient to thereby calculate the filter coefficient.

4. A voice feature extraction device as claimed in claim 3, wherein a specific gain adjustment is executed to the simulated voice signal.

5. A voice feature extraction device as claimed in claim 1, wherein the voice feature extraction device is applied to a voice recognition device of a vehicle navigation system.

6. A voice feature extraction device as claimed in claim 1, wherein the voice feature extraction device is applied to a speaker recognition device.

7. A voice feature extraction device as claimed in claim 1, wherein the voice feature extraction device is applied to a loudness compensation system.

8. A voice feature extraction device comprising:
   a noise reduction system coefficient calculation unit that adds a gain-adjusted simulated voice signal to a surrounding signal, and calculates a noise reduction system coefficient of a noise reduction system based on the added signal and the gain-adjusted simulated voice signal delayed by a delay processing unit, and
   a microphone that collects an input voice signal of a user,
   a window function operation unit that samples the voice signal inputted from the microphone, and prevents generation of high frequency components caused by a data jump at intervals of each frame,
   an input voice signal power spectrum calculation unit that calculates a power spectrum vector of the input voice signal processed by the window function operation unit, and
   a noise reduction system that is set to the coefficient calculated by the noise reduction system coefficient calculation unit, and executes a noise reduction processing on the power spectrum vector.

9. A voice feature extraction device as claimed in claim 8, wherein the noise reduction system coefficient calculation unit includes a filter coefficient calculation unit that determines a filter coefficient of the noise reduction system to be used, and a power calculation unit that converts the filter coefficient acquired by the filter coefficient calculation unit into the power spectrum vector.

10. A voice feature extraction device as claimed in claim 9, wherein the filter coefficient calculation unit executes an adaptive control to the signal having the surrounding signal and the simulated voice signal added, and acquires a tap coefficient to thereby calculate the filter coefficient.

11. A voice feature extraction device as claimed in claim 9, wherein the filter coefficient calculation unit executes a specific gain adjustment to the simulated voice signal, executes an adaptive control to a signal having the surrounding signal and the gain-adjusted simulated voice signal added, and acquires a tap coefficient to thereby calculate the filter coefficient.

12. A method of extracting voice features comprising:
adding a gain-adjusted simulated voice signal to a surrounding signal;
calculating a noise reduction system coefficient of a noise reduction system to be used based on the added signal and the gain-adjusted simulated voice signal delayed by a delay processing unit, and
calculating a power spectrum vector of a power spectrum signal produced from an input voice signal,
wherein the noise reduction system that is set to the calculated noise reduction system coefficient executes a noise reduction processing on the power spectrum vector, and extracts the voice features.

13. A method of extracting voice features as claimed in claim 12, wherein the noise reduction system coefficient is calculated by determining a filter coefficient of the noise reduction system, and by calculating a power spectrum vector from the determined filter coefficient.

14. A method of extracting voice features as claimed in claim 13, wherein the filter coefficient is calculated by executing an adaptive control to a signal produced by adding the surrounding signal and the simulated voice signal to acquire a tap coefficient.

15. A method of extracting voice features as claimed in claim 14, wherein a specific gain adjustment is executed to the simulated voice signal.

16. A method of extracting voice features comprising:
adding a gain-adjusted simulated voice signal to a surrounding signal;
calculating a noise reduction system coefficient of a noise reduction system based on the added signal and the gain-adjusted simulated voice signal delayed by a delay processing unit, and
sampling a voice signal inputted from a microphone,
executing a processing to prevent generation of high frequency components of the input voice signal sampled,
calculating a power spectrum vector of a power spectrum signal produced from the input voice signal that is processed to prevent generation of high frequency components, and
calculating a voice feature from the power spectrum vector via the noise reduction system that is set to the calculated noise reduction system coefficient.

17. The method of extracting voice features as claimed in claim 16, wherein the noise reduction system coefficient is attained by:
executing an adaptive control to the added signals to thereby calculate a filter coefficient, and
applying a fast Fourier transform to the filter coefficient to thereby calculate the power spectrum vector.

18. A voice feature extraction device comprising:
a microphone that collects a surrounding signal;
a simulated voice signal generation unit that generates a simulated voice signal;
a gain adjustment unit that adjusts a gain of the simulated voice signal;
an adder that adds the surrounding signal collected by the microphone and the gain-adjusted simulated voice signal;
a delay processing unit that delays the gain-adjusted simulated voice signal by a predetermined time;
an adaptive filter that executes an adaptive control on the signals added by the adder and the simulated voice signal delayed by the delay processing unit, and generates a filter coefficient;
an FFT operation unit that executes a fast Fourier transform on the filter coefficient generated by the adaptive control of the adaptive filter;
a power calculation unit that calculates a power spectrum vector from a power spectrum signal calculated by the FFT operation unit; and
a noise reduction system having the power spectrum vector calculated by the power calculation unit set as a noise reduction coefficient.

* * * * *